US012481197B2

(12) United States Patent
Garrett et al.

(10) Patent No.: US 12,481,197 B2
(45) Date of Patent: Nov. 25, 2025

(54) PHASE CONTROL FOR DOUBLE-NESTED QUADRATURE MODULATOR

(71) Applicant: LUMENTUM TECHNOLOGY UK LIMITED, Northamptonshire (GB)

(72) Inventors: Brian Garrett, Devon (GB); Amyas Holroyd, Devon (GB); Chalani Abeywardena, Devon (GB); Michael Rigby-Jones, Devon (GB)

(73) Assignee: Lumentum Technology UK Limited, Northamptonshire (GB)

( * ) Notice: Subject to any disclaimer, the term of this patent is extended or adjusted under 35 U.S.C. 154(b) by 449 days.

(21) Appl. No.: 18/179,797

(22) Filed: Mar. 7, 2023

(65) Prior Publication Data
US 2024/0192568 A1 Jun. 13, 2024

Related U.S. Application Data

(60) Provisional application No. 63/387,059, filed on Dec. 12, 2022.

(51) Int. Cl.
*G02F 1/21* (2006.01)
(52) U.S. Cl.
CPC .................................. *G02F 1/212* (2021.01)
(58) Field of Classification Search
CPC ........................................................ G02F 1/212
See application file for complete search history.

(56) References Cited

U.S. PATENT DOCUMENTS

| | | | | |
|---|---|---|---|---|
| 7,756,169 B2* | 7/2010 | Livingston | ............ | H01S 3/1307 372/102 |
| 9,835,928 B1* | 12/2017 | Shen | ..................... | G02F 1/2255 |
| 10,545,390 B2* | 1/2020 | Mizrahi | ................. | G02F 1/225 |
| 10,623,105 B2* | 4/2020 | Schmogrow | ..... | H04B 10/50575 |
| 11,852,948 B2* | 12/2023 | Yamabana | ............. | G02F 1/212 |
| 2022/0146900 A1* | 5/2022 | Holroyd | .................. | G02F 1/225 |

* cited by examiner

*Primary Examiner* — Kenneth N Vanderpuye
*Assistant Examiner* — Asif Shameem
(74) *Attorney, Agent, or Firm* — Harrity & Harrity, LLP

(57) ABSTRACT

In some implementations, a controller may apply a set of phase dithers to a first inner Mach-Zehnder (MZ) interferometer and a second inner MZ interferometer, the first inner MZ interferometer and the second inner MZ interferometer being included in an outer MZ interferometer, the set of phase dithers including a first in-phase dither state and a second in-phase dither state and including a first anti-phase dither state and a second anti-phase dither state. The controller may determine an initial error term based at least in part on the set of phase dithers. The controller may adjust, based on the initial error term, the outer MZ interferometer to a target phase associated with a target error term, wherein respective branches of at least one of the first MZ interferometer or the second MZ interferometer are adjusted differentially.

20 Claims, 12 Drawing Sheets

PHASE CONTROL FOR DOUBLE-NESTED QUADRATURE MODULATOR

CROSS-REFERENCE TO RELATED APPLICATION

This Patent Application claims priority to U.S. Provisional Patent Application No. 63/387,059, filed on Dec. 12, 2022, and entitled "SEQUENTIAL QUAD STATE OUTER PHASE CONTROL OF DOUBLE NESTED QUADRATURE MODULATOR." The disclosure of the prior Application is considered part of and is incorporated by reference into this Patent Application.

TECHNICAL FIELD

The present disclosure relates generally to modulators and to phase control for a double-nested quadrature modulator.

BACKGROUND

An optical modulator for an optical system may include one or more Mach-Zehnder (MZ) interferometers to enable modulation control for the optical system. An MZ interferometer may have a set of arms that, when an electric field is applied differentially to the set of arms, can change optical path lengths of the set of arms. By changing the optical path lengths of the set of arms, the optical modulator can cause phase modulation to be applied to a beam. When two arms of the MZ interferometer have different phase modulations, the optical modulator can control an optical intensity of the beam.

SUMMARY

In some implementations, a method includes applying, by a controller, a set of phase dithers to a first inner Mach-Zehnder (MZ) interferometer and a second inner MZ interferometer, the first inner MZ interferometer and the second inner MZ interferometer being included in an outer MZ interferometer, the set of phase dithers including a first in-phase dither state and a second in-phase dither state and including a first anti-phase dither state and a second anti-phase dither state; determining, by the controller, an initial error term based at least in part on the set of phase dithers; and adjusting, by the controller and based on the initial error term, the outer MZ interferometer to a target phase associated with a target error term, wherein respective branches of at least one of the first MZ interferometer or the second MZ interferometer are adjusted differentially.

In some implementations, a double-nested quadrature modulator includes an outer MZ interferometer including an in-phase (I) branch and a quadrature (Q) branch, the I branch including a first inner MZ interferometer having a first left branch and a first right branch, the Q branch including a second inner MZ interferometer having a second left branch arm and a second right branch, a phase between the first inner MZ interferometer and the second inner MZ interferometer being 90 degrees or −90 degrees; the double-nested quadrature modulator being configured to: receive a set of phase dithers at the first inner MZ interferometer and at the second inner MZ interferometer, the set of phase dithers including one or more in-phase dither states and one or more anti-phase dither states; and receive an adjustment to the outer MZ interferometer, wherein sub-branches of the I branch and the Q branch are adjusted differentially without a direct dither being applied to the outer MZ interferometer.

In some implementations, a double-nested quadrature modulator includes an outer MZ interferometer including an I branch and a Q branch, the I branch including a first inner MZ interferometer having a first left branch and a first right branch, the Q branch including a second inner MZ interferometer having a second left branch arm and a second right branch, a phase difference between the first inner MZ interferometer and the second inner MZ interferometer being approximately 90 degrees or −90 degrees; and a controller configured to: apply a set of phase dithers to the first inner MZ interferometer and the second inner MZ interferometer, the set of phase dithers including: a first dither state [I+δθ°, Q+δθ°], a second dither state [I+δθ°, Q−δθ°], a third dither state [I−δθ°, Q−δθ°], and a fourth dither state [I−δθ°, Q+δθ°], wherein δθ represents a phase dither applied to one or more branches of the first inner MZ interferometer or the second inner MZ interferometer; determine an initial error term based at least in part on the set of phase dithers; and adjust, based on the initial error term, the outer MZ interferometer to a target error term, wherein branches of the I branch and the Q branch are adjusted differentially without a direct dither applied to the outer MZ interferometer.

DETAILED DESCRIPTION

Figure 1A:
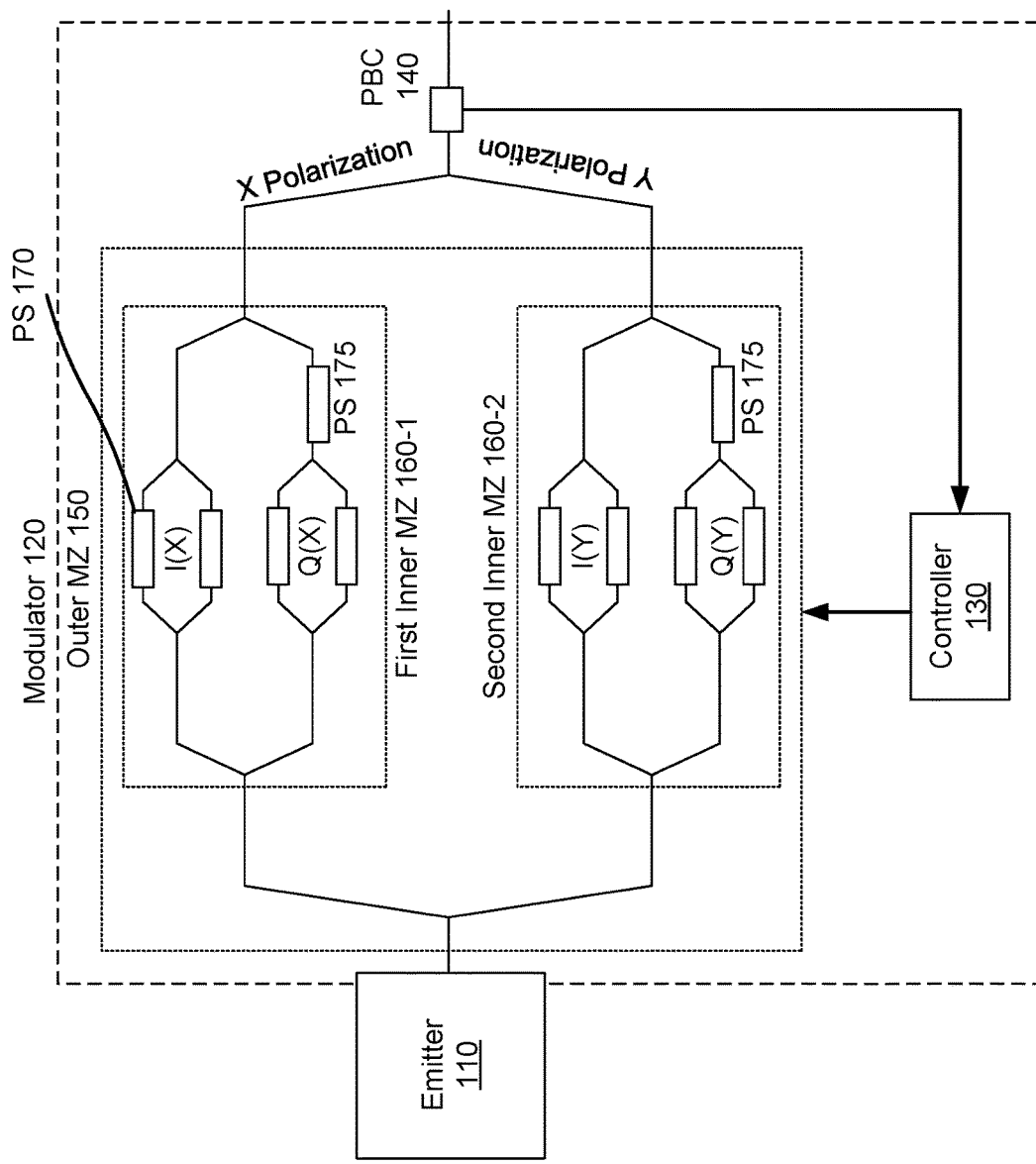
FIGS. 1A-1D are diagrams of an example implementation associated with phase control for double-nested quadrature modulator.

The following detailed description of example implementations refers to the accompanying drawings. The same reference numbers in different drawings may identify the same or similar elements.

Optical modulators may be used to control an output of an optical beam in, for example, an optical communications system. One architecture for realizing an optical modulator is to use a Mach-Zehnder (MZ) interferometer. A dual-nested quadrature modulator, for n-ary quadrature amplitude modulation (QAM), is one example of an optical modulator that uses an MZ interferometer. The dual-nested quadrature modulator may include an outer MZ interferometer (which may be referred to as an "outer MZ") that includes an in-phase (I) branch with a first inner MZ interferometer (which may be referred to as an "inner MZ") and a quadrature (Q) branch with a second inner MZ interferometer. Each inner MZ interferometer has a respective left branch and a respective right branch. Control of the dual-nested quadrature modulator is achieved through effective stable control of phases of the inner MZ interferometers and of a phase of the outer MZ interferometer. One technique for achieving such control is to control the inner MZ phases to a local null (e.g., a minimum output power) and controlling the outer MZ phase to a quadrature point (e.g., which may correspond to half power from an optical combiner).

Controlling the outer MZ phase to, for example, a quadrature point can be achieved using various techniques, such as minimizing low-frequency radio frequency (RF) content of an MZ output signal, outputting signal demodulation using a direct conversion receiver, or via dither tones, among other examples. When using dither tones, a controller can apply dither tones with a second harmonic or fundamental power ratio or use asymmetric bias dithering with orthogonal phase tones. However, the above-mentioned techniques use additional specialized components and/or substantial processing to achieve a threshold level of functionality (e.g., a threshold level of accuracy in control to enable, for example, optical communications). For example, some of the above-mentioned techniques may use RF to direct current (DC) amplifiers or convertors, tone generators, direct constellation detection, or coherent constellation detection. This may add excessive cost, use excessive processing resources, or result in an excessive form-factor, which may prevent or delay deployment of increasingly dense optical communications networks.

Some implementations described herein provide for controlling a dual-nested quadrature modulator that includes MZ interferometers. For example, a controller may cause a phase dither to be applied to the I and Q inner MZs in a sequenced phase quadrature in four dither states, which causes a center of a detected constellation to be offset in the four dither states. An outer MZ output power level or photocurrent is measured in each state and an initial error term (e.g., an analog-to-digital converter (ADC) error term referenced to an RF power) is determined from a difference between values for the outer MZ output power or photocurrent in each state. In this case, the outer MZ phase can be adjusted to cause the initial error term to change to a target error term (e.g., an error value of 0, which corresponds to a target phase, such as a quadrature phase, of the outer MZ). In this case, adjusting the outer MZ phase to reach the target error term results in the outer MZ phase being controlled to a desired state, such as a quadrature point. In this case, by applying the four dither states, the controller can control the outer MZ phase without using specialized components or complex calculations. In this way, an optical system can be deployed with reduced cost, reduced utilization of processing resources, and/or reduced form factor, thereby enabling widespread, rapid deployment of optical communications networks.

FIGS. 1A-1D are diagrams of an example implementation 100 associated with phase control for double-nested quadrature modulator. As shown in FIGS. 1A-1D, example implementation 100 includes an emitter 110 and a modulator 120. The modulator 120 includes a controller 130, which is described in more detail below in connection with FIG. 4.

The emitter 110 may include an optical emitter that outputs a beam for modulation using the modulator 120. For example, the emitter 110 may include a vertical cavity surface emitting laser (VCSEL), an edge emitting laser (EEL), a diode, or another type of optical emitter capable of outputting one or more beams. In some implementations, the emitter 110 and the modulator 120 may be included in an optical system. For example, the emitter 110 may be associated with generating and outputting a beam for an optical communications system.

The modulator 120 may be a dual-nested quadrature modulator. For example, the modulator 120 may include the controller 130, a polarization beam combiner 140, an outer MZ 150, a first inner MZ 160-1, and a second inner MZ 160-1. In some implementations, the polarization beam combiner 140 may be associated with an optical tap that may enable measurement of an output of the outer MZ 150 (e.g., a combined output of the first inner MZ 160-1 and the second inner MZ 160-2). For example, an optical power monitor, port, or tap may be included on an optical path after beam combining at the polarization beam combiner 140, and a measurement performed by the optical power monitor may be provided to the controller 130. For example, the controller 130 may receive power measurements and provide dither control signals and/or other control signals to enable modulation using the modulator 120, as described below.

The outer MZ 150 may include a set of branches on which the inner MZs 160 are disposed. For example, the outer MZ 150 may have a left branch or an upper branch that includes the first inner MZ 160-1, and a right branch or a lower branch that includes the second inner MZ 160-2. In another example, the left branch may be referred to as an X polarization branch or an in-phase (I) branch, and the right branch may be referred to as a Y polarization branch or a quadrature (Q) branch.

An inner MZ 160 may include a set of branches on which a corresponding set of phase shifters 170 are disposed (shown as a "PS 170" for an uppermost branch in FIG. 1A). For example, the first inner MZ 160-1 includes a first branch (e.g., a first left branch or a first I branch) I(X), which includes a pair of phase shifters 170 aligned to an upper sub-branch and a lower sub-branch of I(X), and a second branch (e.g., a first right branch or a first Q branch) Q(X), which includes a pair of phase shifters 170 aligned to an upper sub-branch and a lower sub-branch of Q(X). Similarly, the second inner MZ 160-2 includes a first branch (e.g., a second left branch or a second I branch) I(Y), which includes a pair of phase shifters 170 on an upper sub-branch and a lower sub-branch of I(Y), and a second branch (e.g., a second right branch or a second Q branch) Q(Y), which includes a pair of phase shifters 170 on an upper sub-branch and a lower sub-branch of Q(Y). The phase shifters 170 receive electrical signals that are dithered to apply a set of dither states, as described below. The controller 130 may control the electrical signals and the dithering thereof to calibrate the modulator 120. Additionally, or alternatively, each inner MZ 160-1 includes a phase shifter 175 that offsets an output of a respective Q branch from an output of a respective I branch by 90 degrees (or −90 degrees).

Figure 1B:
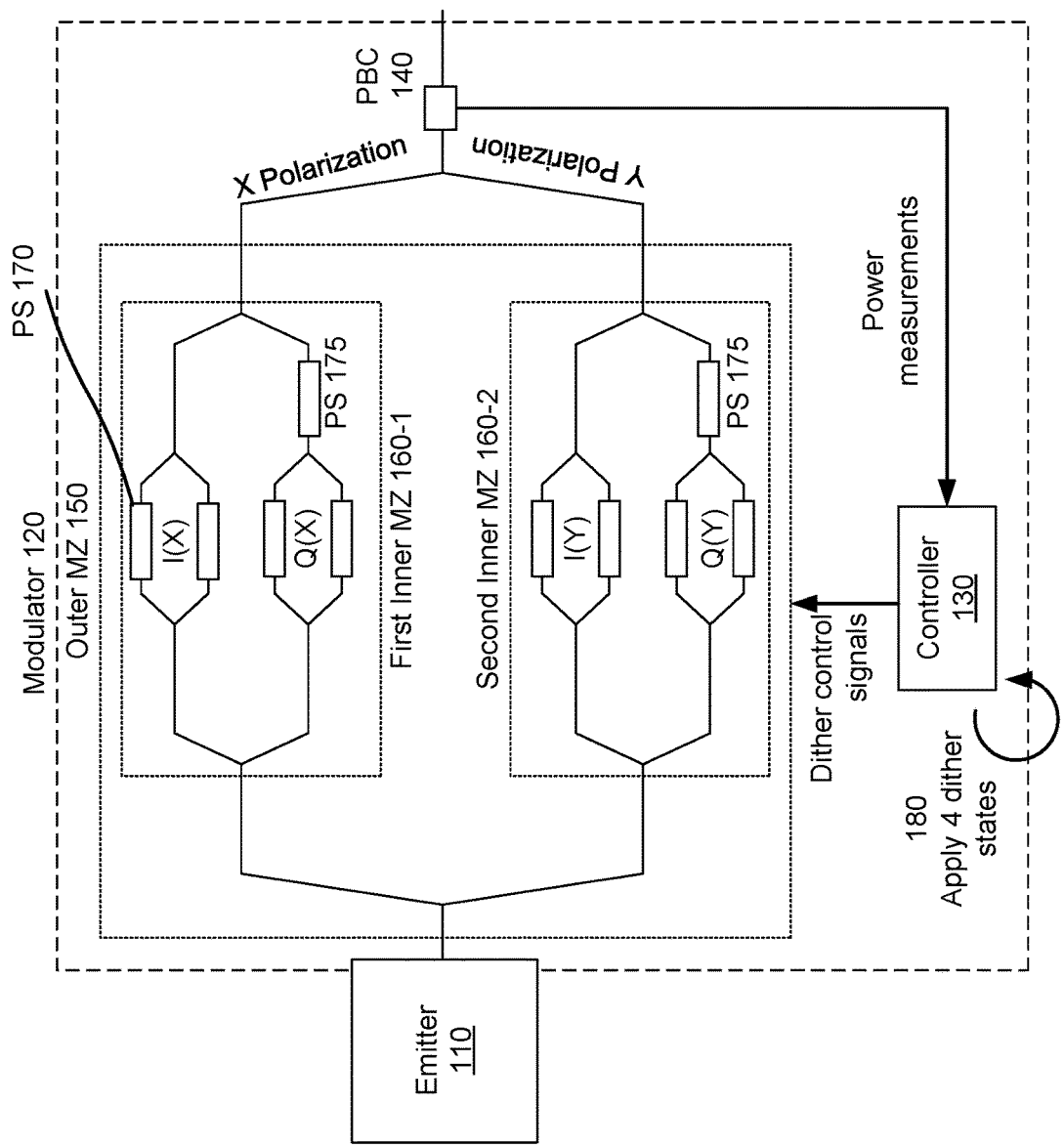

As shown in FIG. 1B, and by reference number 180, the controller 130 may cause a set of dither states to be applied to the modulator 120. For example, the controller 130 may provide dither control signals to apply phase dither to an I branch and/or a Q branch of an inner MZ 160 in sequenced phase quadrature. In some implementations, the controller 130 may measure an outer MZ output power level or photocurrent for each dither state. For example, the controller 130 may receive power measurements from a power monitor associated with the polarization beam combiner 140. In some implementations, the set of dither states may be associated with a phase offset. For example, the dither states may be a set of dither states as shown in Table 1:

| | |
|---|---|
| Dither State 1 | I + δθ°  Q + δθ° |
| Dither State 2 | I + δθ°  Q − δθ° |
| Dither State 3 | I − δθ°  Q + δθ° |
| Dither State 4 | I − δθ°  Q − δθ° | where $\delta\theta$ represents a phase dither applied to an inner MZ phase. The amount of phase dither (e.g., $\delta\theta$) can be in a range of 1° to 15°. In this case, the first dither state and the third dither state are in-phase dither states (e.g., the controller 130 causes an in-phase dither to be applied to the I and Q branches of an inner MZ 160) and the second dither state and fourth dither state are anti-phase dither states (e.g., the controller 130 causes an anti-phase dither to be applied to the I and Q branches of an inner MZ 160).

Figure 1C:
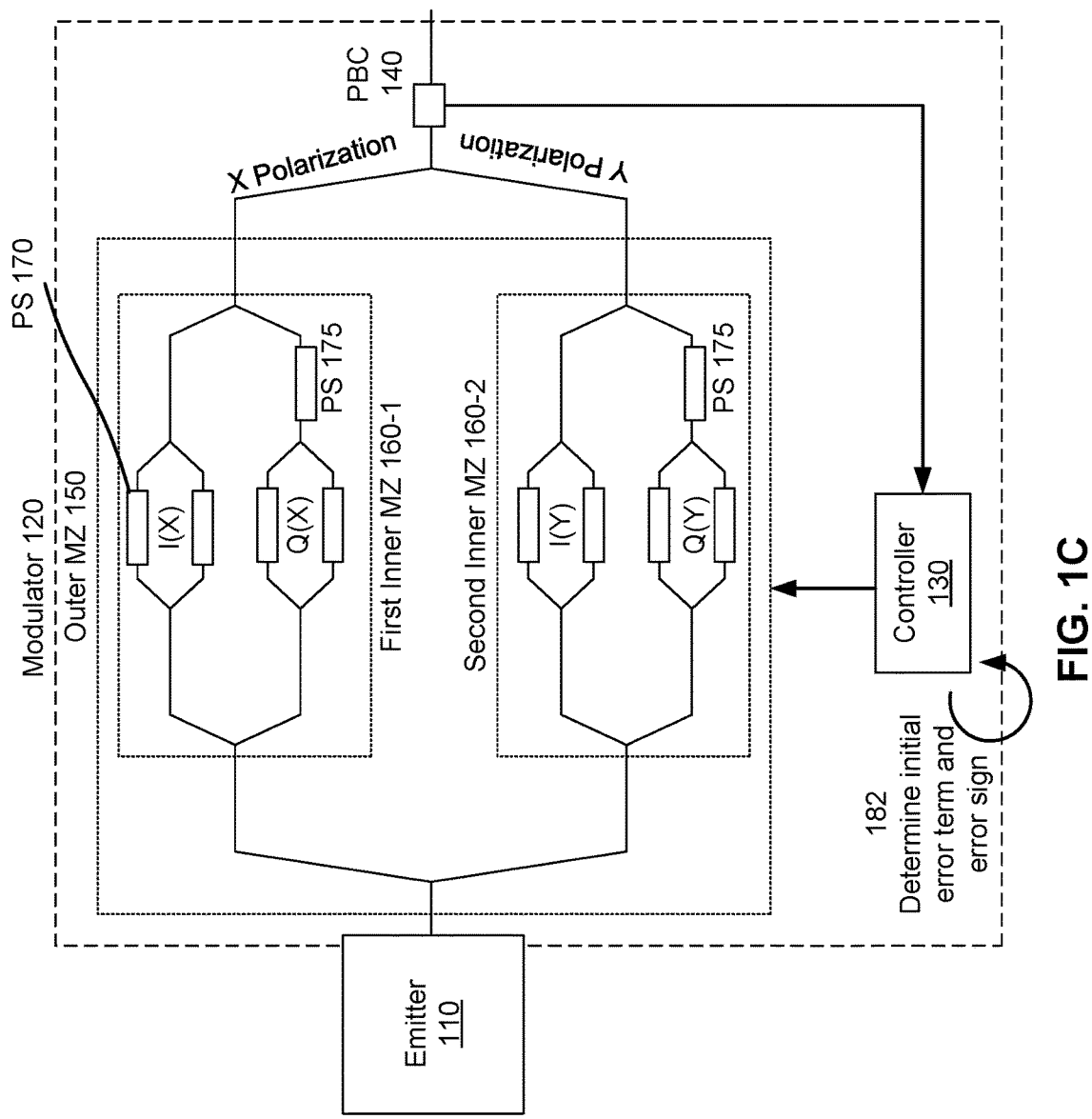

As shown in FIG. 1C, and by reference number 182, the controller 130 may determine an initial error term and an error sign. For example, the controller 130 may determine the initial error term based on measured power outputs from the outer MZ 150 when each dither state is being applied. In this case, the controller 130 may determine the initial error term as Error=(IQState(1)+IQState(3))−(IQState(2)+IQState(4)), where IQState(n) represents a measured power output for a dither state n. In other words, the error term represents a difference between measured optical powers for the in-phase dither states and the anti-phase dither states. In some implementations, the controller 130 may determine the sign of the initial error term based on a port used for monitoring the power output of the outer MZ 150. For example, the controller 130 may use a first sign for a destructive port and a second, different sign for a constructive port. Additionally, or alternatively, the controller 130 may determine the sign of the error term based on a slope of fields of the inner MZs 160. For example, the controller 130 may determine a slope of the fields of the inner MZs 160 by scanning a phase of the outer MZ 150 when respective phases of the inner MZs 160 are set to null.

Figure 1D:
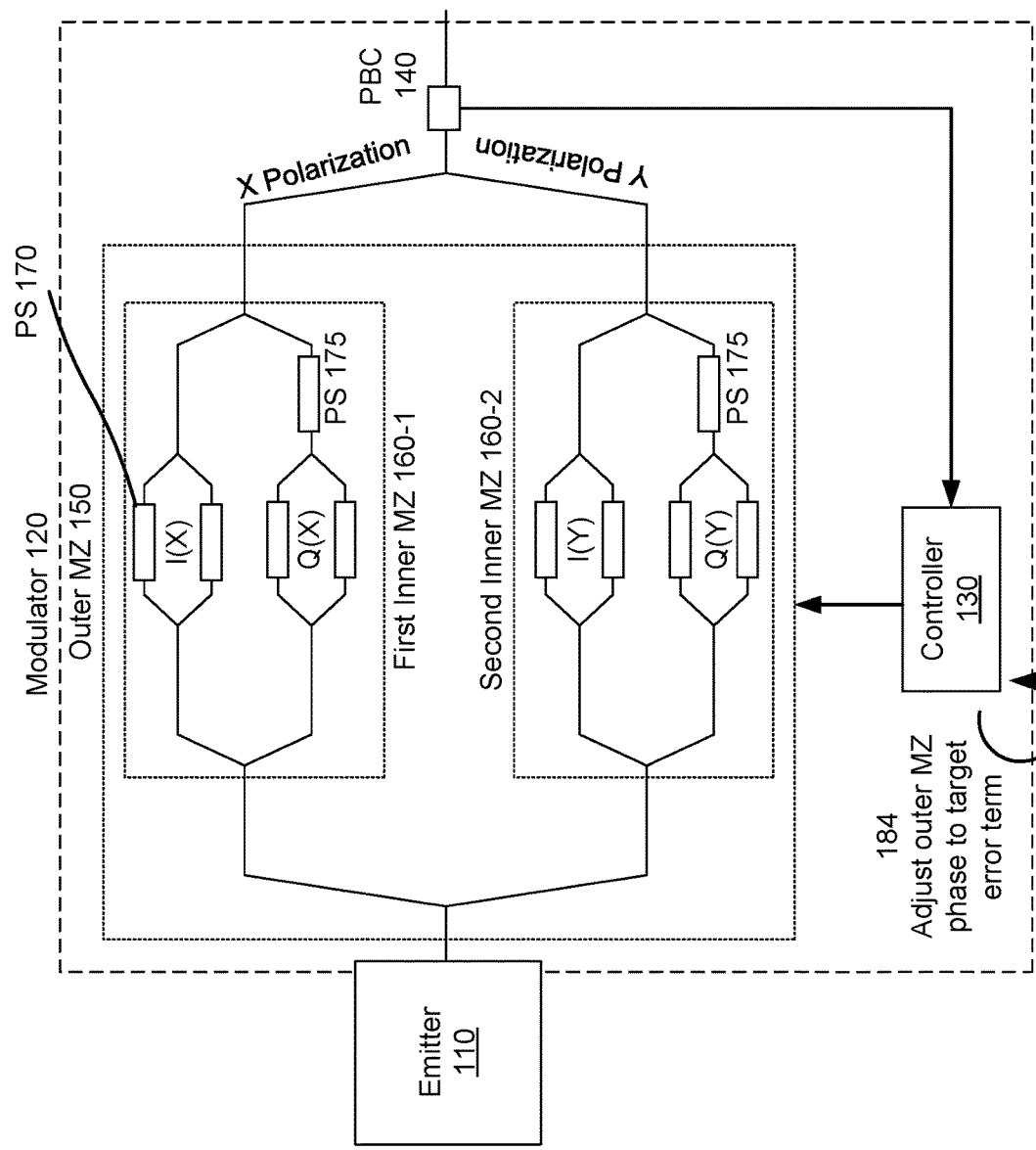

As shown in FIG. 1D, and by reference number 184, the controller 130 may adjust a phase of the outer MZ 150 to achieve a target error term. For example, the controller 130 may adjust the phase of the outer MZ 150 to cause a calculated error term to be adjusted from the initial error term to an error of 0 (zero). In this case, the controller 130 may transmit control signals to adjust a phase of the outer MZ 150 with a particular step size (e.g., a step size in a range of 0.1° to 15°) until the error term reaches 0. With each phase adjustment of the outer MZ 150, the controller 130 may cause the set of dither states to be applied, sequentially, to the inner MZs 160 to determine a new error term and, when the new error term has not reached the target error term (e.g., 0), the controller 130 may continue adjusting the phase of the outer MZ 150. The sequential application of the set of dither states by the controller 130 may cause a center of a constellation of the modulator 120 to rotate in a circular manner.

In some implementations, the controller 130 may use a variable step size for adjusting the phase of the outer MZ 150. For example, the controller 130 may implement a control algorithm that adjusts the step size (e.g., decreasing step sizes to achieve improved granularity) based on previous error terms and/or a current measured error term. In this way, the controller 130 may reach the target phase and associated target error term in a reduced amount of time and/or with a reduced quantity of instances of applying the set of dither states, relative to using a fixed step size.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2A:
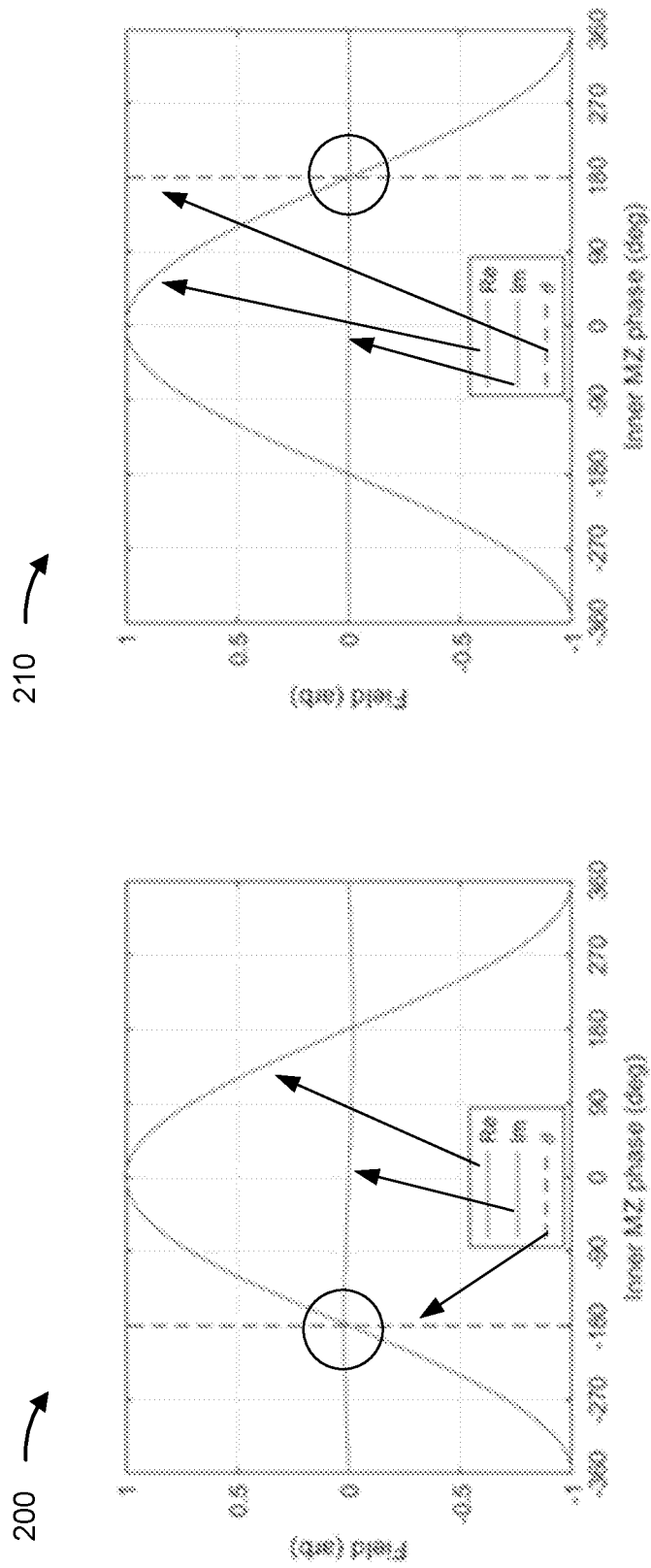
FIGS. 2A-2C are a set of diagrams associated with error term sign determination.
Figure 2B:
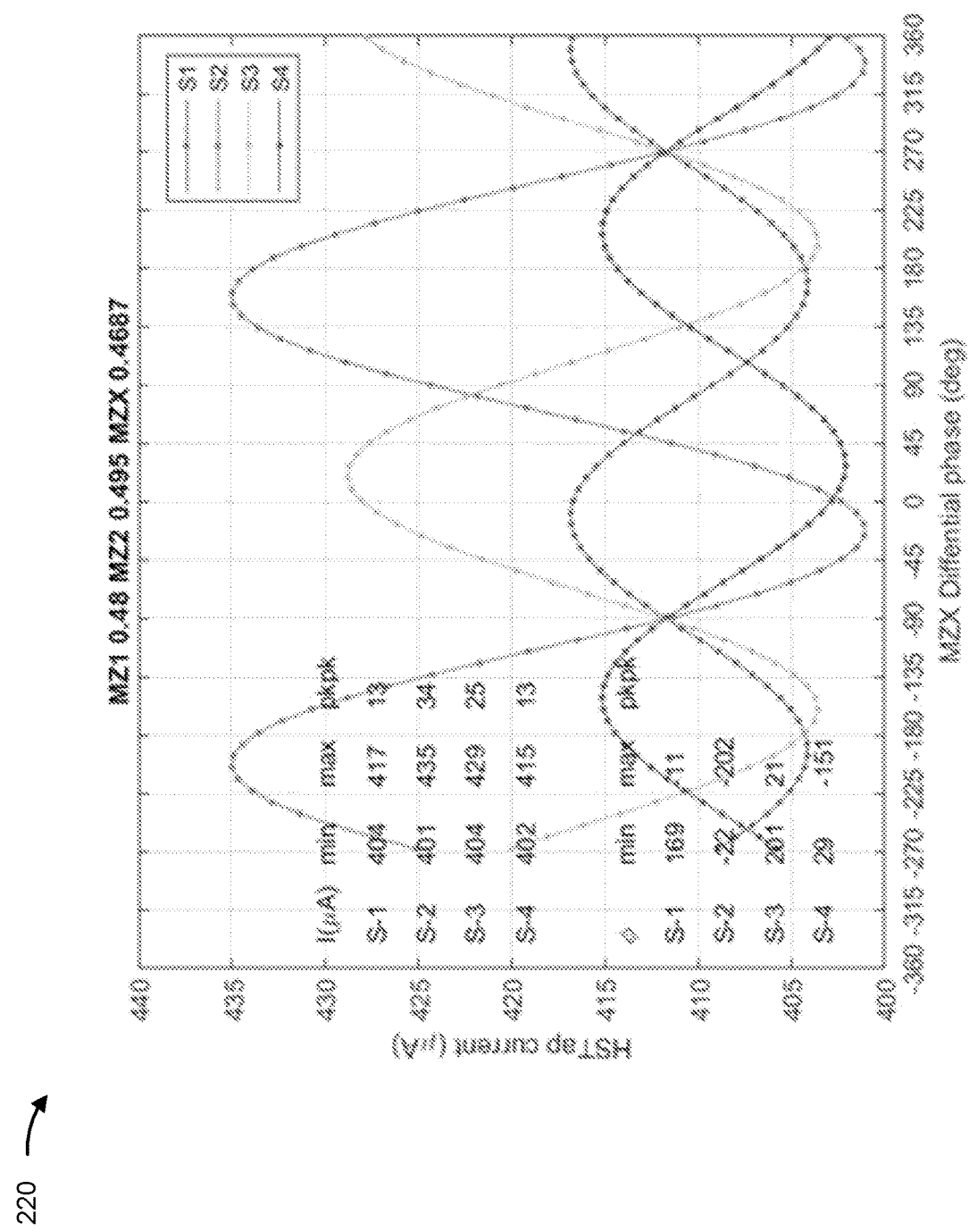
Figure 2C:
Figure 3A:
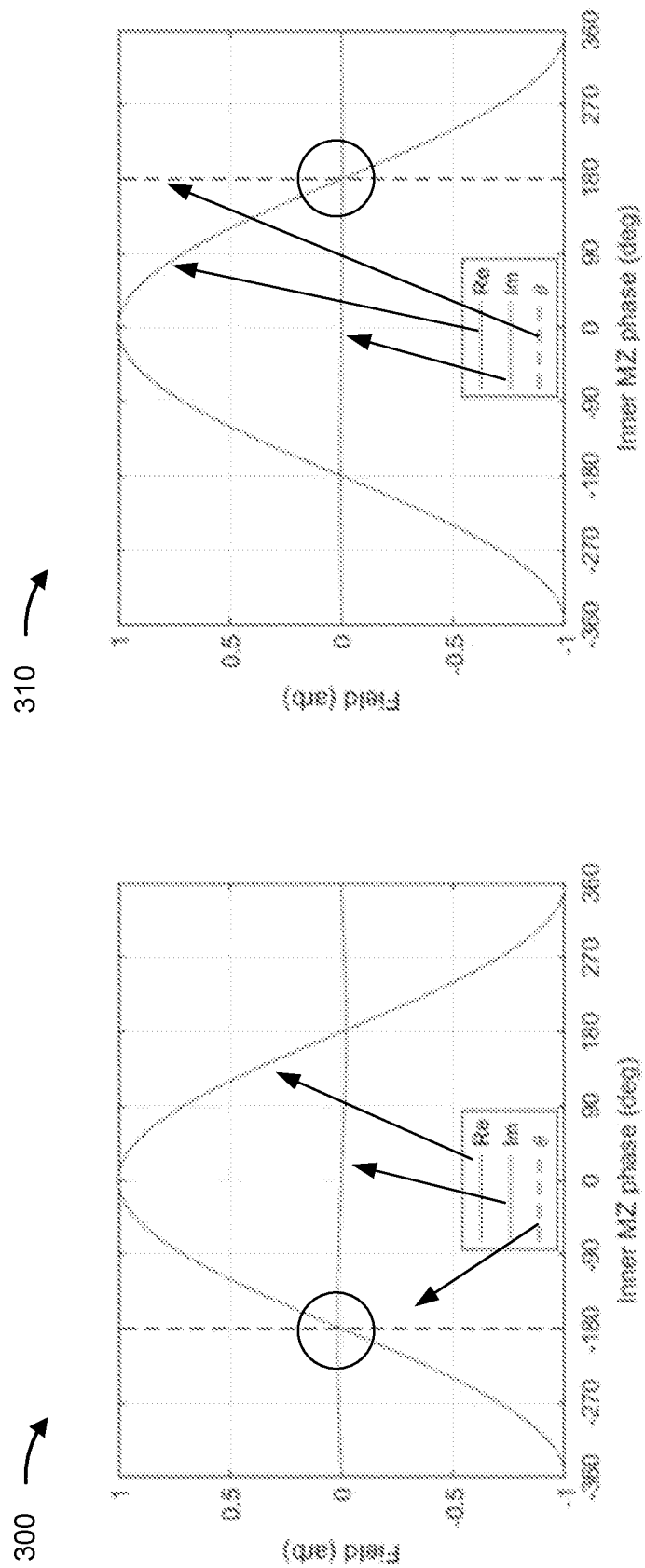
FIGS. 3A-3C are a set of diagrams associated with error term sign determination.
Figure 3B:
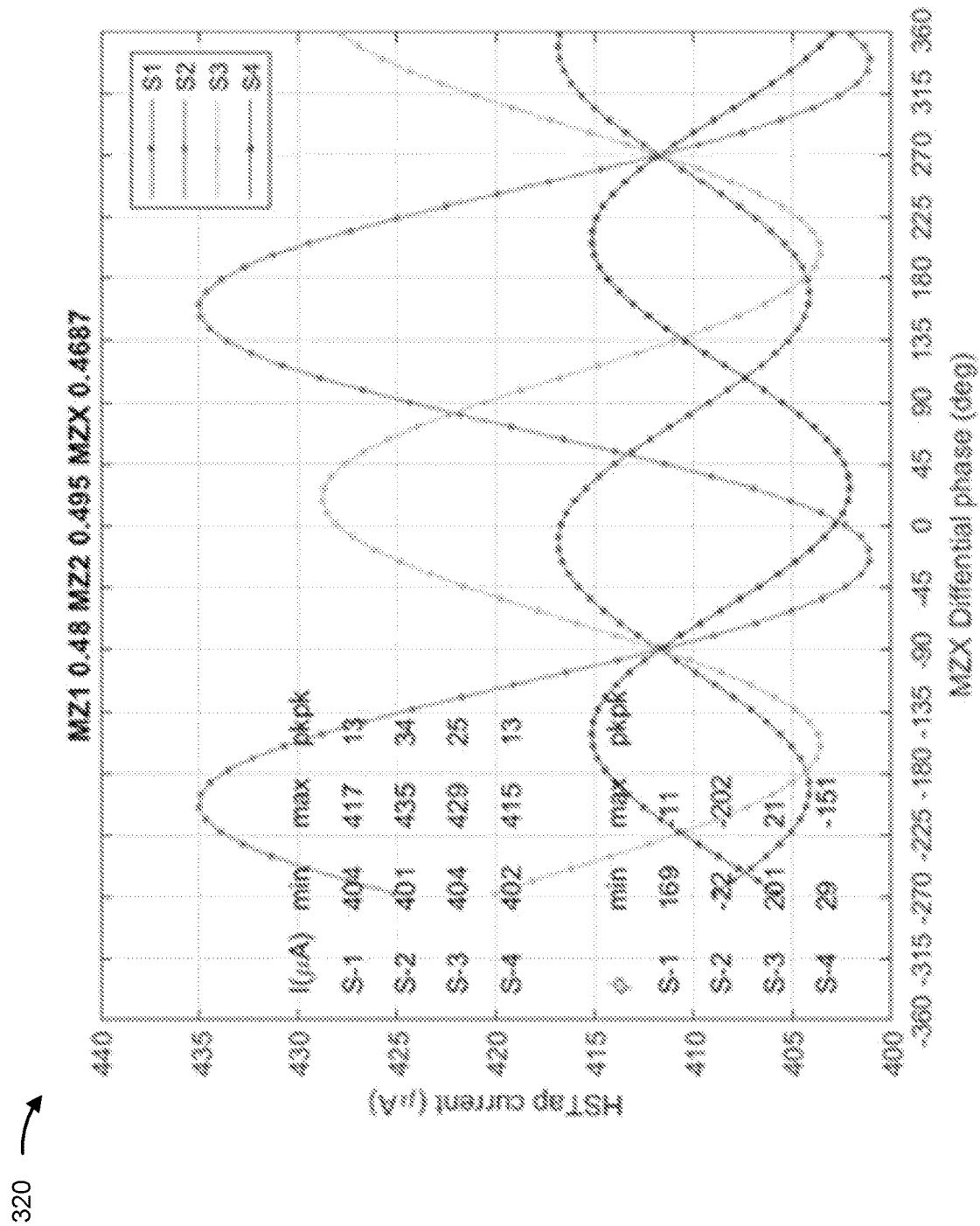
Figure 3C:
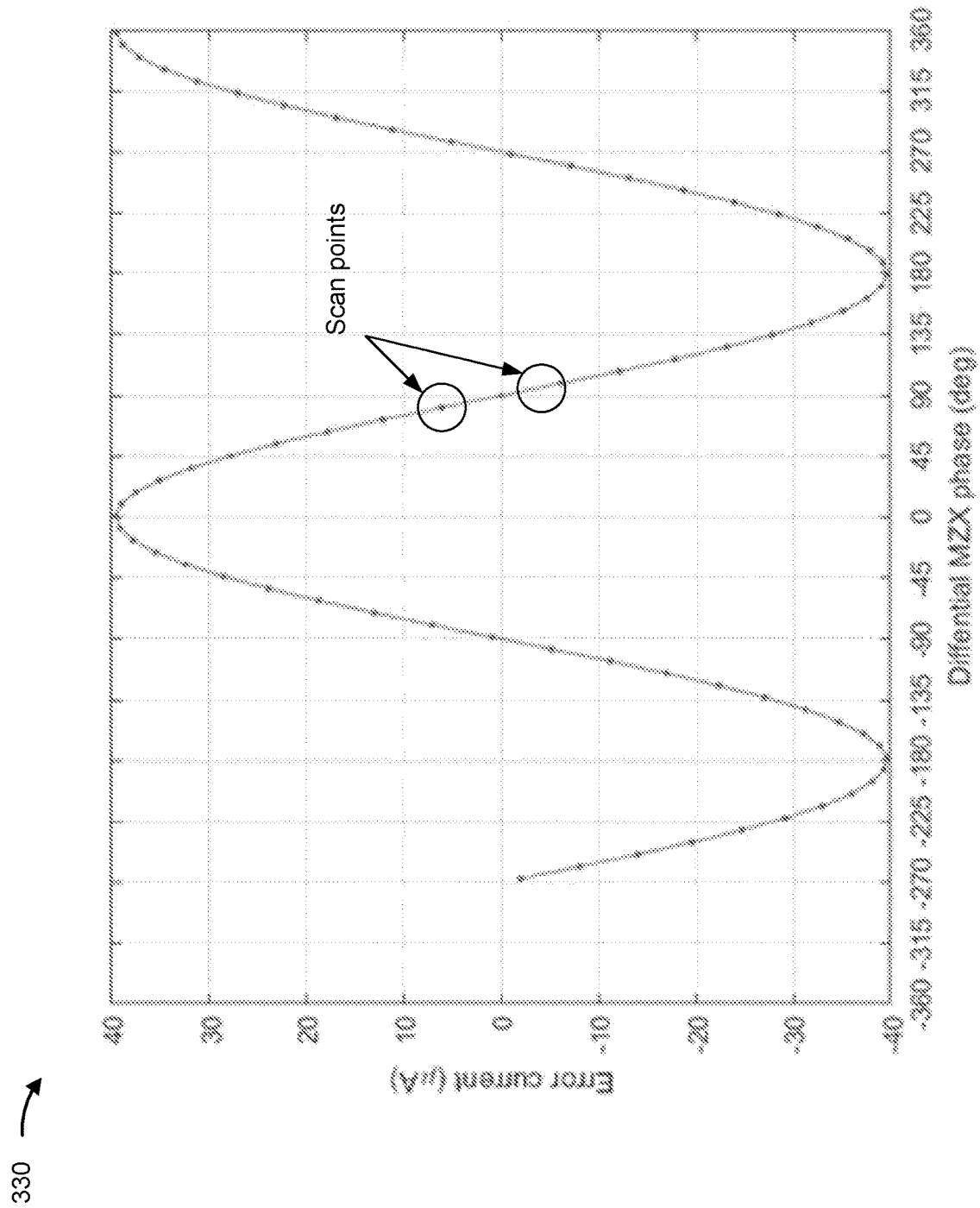

FIGS. 2A-2C include a set of diagrams 200, 210, 220, and 230 associated with error term sign determination. FIGS. 3A-3C include a set of diagrams 300, 310, 320, and 330 associated with error term sign determination.

As shown in FIG. 2A, and as described above, the controller 130 may determine a sign of an error term based on a slope of the fields of the two inner MZs 160. For example, diagrams 200 and 210 show an inner MZ phase for an I branch (e.g., inner MZ 160-1) versus a field for the I branch, and an inner MZ phase for a Q branch (e.g., inner MZ 160-2) versus a field for the Q branch, respectively. During operation of the modulator 120, when the field is relatively high (e.g., at phases −360°, 0°, and 360°, as shown), output power of the outer MZ 150 is at a peak. In contrast, a slope of the field can be determined at a null (e.g., a minimum point at −180° and 180°, as shown). Adjacent nulls have opposite field slopes through the null. In other words, at −180°, field slope is transitioning from negative to positive, and at 180°, field slope is transitioning from positive to negative. However, rather than measuring the field, the controller 130 receives measurements of the port currents, as shown in FIG. 2B (and in FIG. 3B). To determine the slope, the controller 130 can execute a scan of, for example, +/−10° around a 900 (or −90°) point to determine, as shown in FIG. 2C, whether the slope is positive or negative.

In contrast, when operating with the first inner MZ 160-1 on a negative field slope null and the second inner MZ 160-2 on a positive field slope null, as shown in FIG. 3A, a phase of an error signal, shown in FIG. 3C, is inverted (e.g., relative to the phase of the error signal shown in FIG. 2C). Here, again, the controller 130 can execute a scan to determine whether the slope is positive or negative. The controller 130 may maintain a fixed operating point after calibrating an optical system using the modulator 120.

As indicated above, FIGS. 2A-3C are provided as an example. Other examples may differ from what is described with regard to FIGS. 2A-3C.

Figure 4:
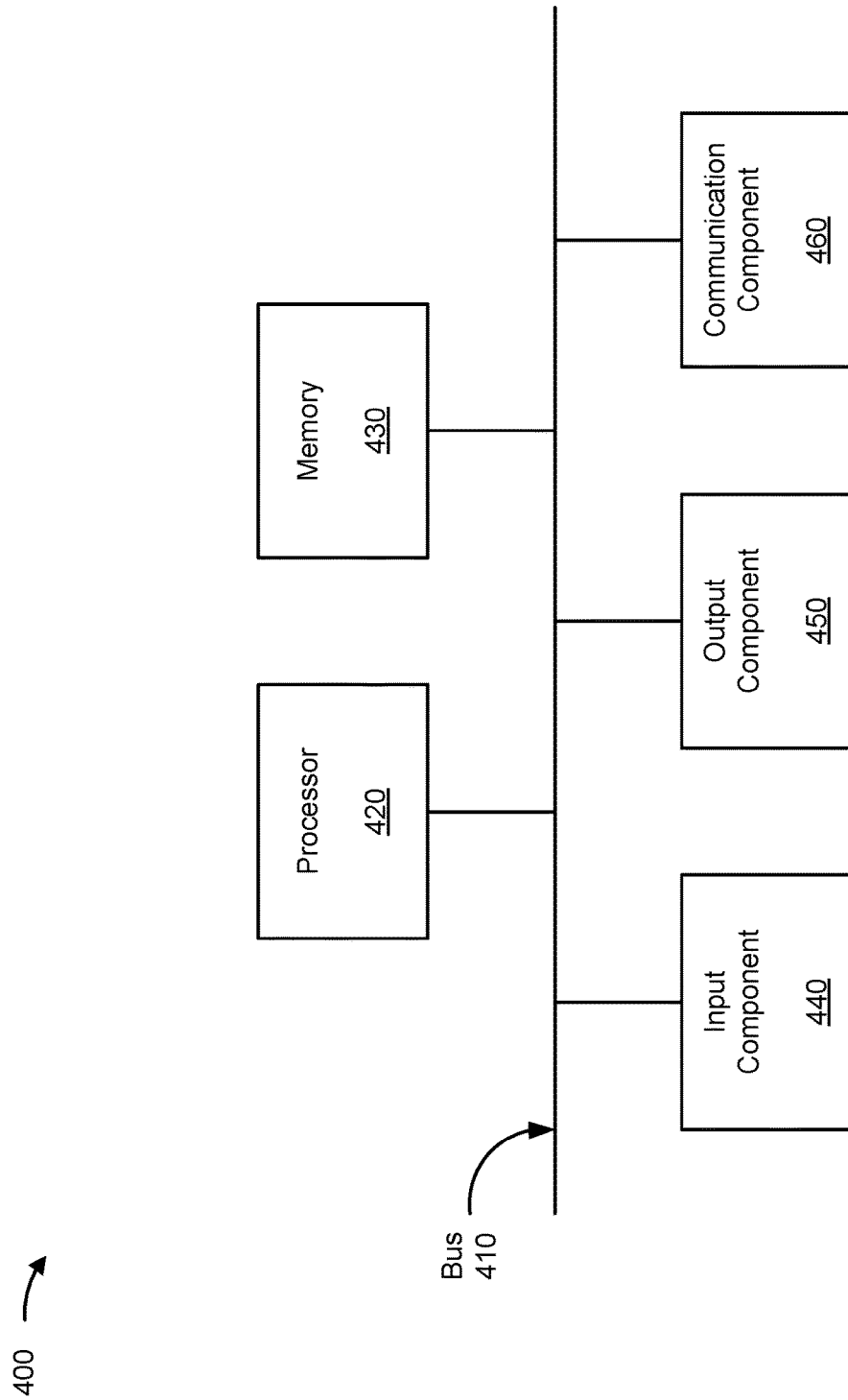
FIG. 4 is a diagram of example components of a device associated with phase control for a double-nested quadrature modulator.

FIG. 4 is a diagram of example components of a device 400 associated with phase control for a double-nested quadrature modulator. The device 400 may correspond to the controller 130. In some implementations, the controller 130 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
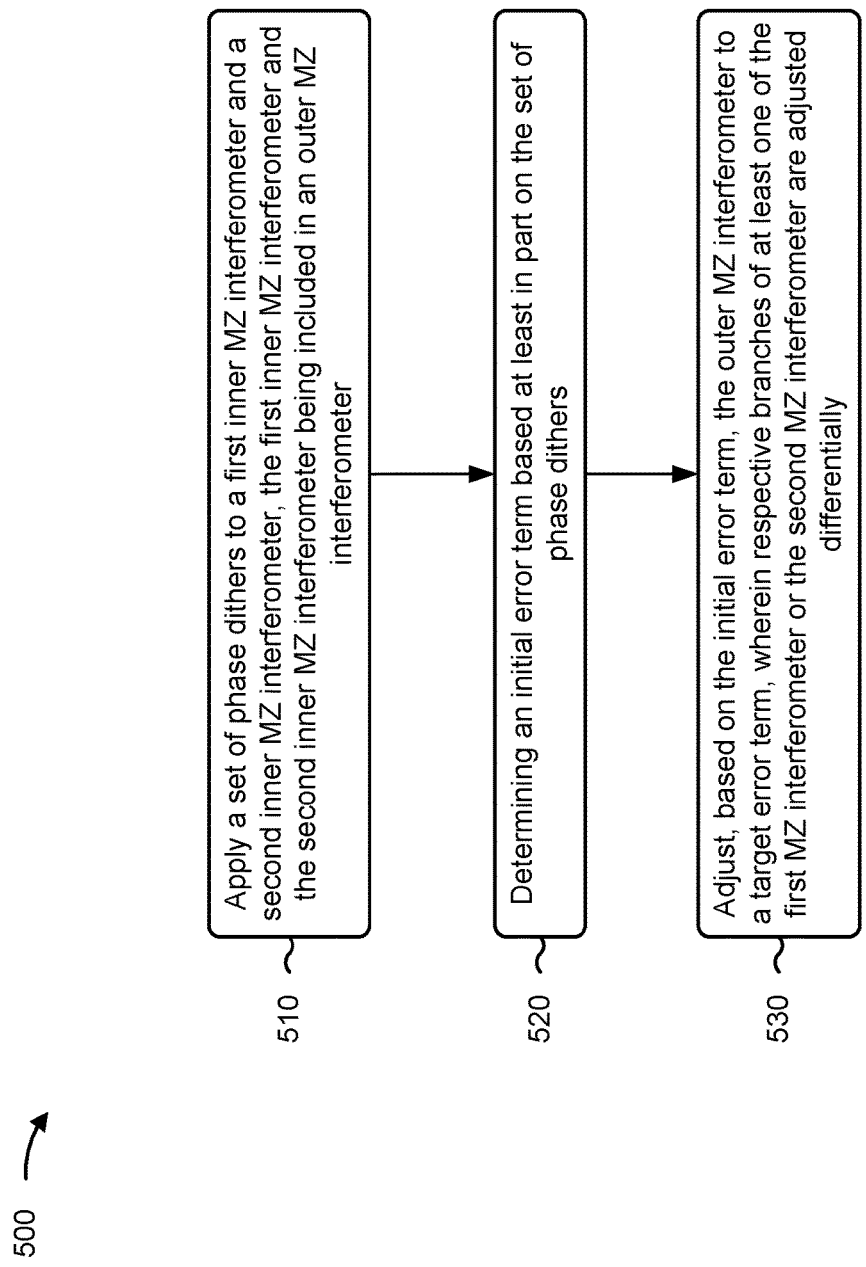
FIG. 5 is a flowchart of an example process associated with phase control for double-nested quadrature modulator.

FIG. 5 is a flowchart of an example process 500 associated with phase control for double-nested quadrature modulator. In some implementations, one or more process blocks of FIG. 5 are performed by a controller (e.g., controller 130). In some implementations, one or more process blocks of FIG. 5 are performed by another device or a group of devices separate from or including the controller. Additionally, or alternatively, one or more process blocks of FIG. 5 may be performed by one or more components of device 400, such as processor 420, memory 430, input component 440, output component 450, and/or communication component 460.

As shown in FIG. 5, process 500 may include applying a set of phase dithers to a first inner MZ interferometer and a second inner MZ interferometer, the first inner MZ interferometer and the second inner MZ interferometer being included in an outer MZ interferometer (block 510). For example, the controller may apply a set of phase dithers to a first inner MZ interferometer and a second inner MZ interferometer, the first inner MZ interferometer and the second inner MZ interferometer being included in an outer MZ interferometer, as described above. In some implementations, the set of phase dithers include a first in-phase dither state and a second in-phase dither state and including a first anti-phase dither state and a second anti-phase dither state.

As further shown in FIG. 5, process 500 may include determining, by the controller, an initial error term based at least in part on the set of phase dithers (block 520). For example, the controller may determine an initial error term based at least in part on the set of phase dithers, as described above.

As further shown in FIG. 5, process 500 may include adjusting, based on the initial error term, the outer MZ interferometer to a target error term, wherein respective branches of at least one of the first MZ interferometer or the second MZ interferometer are adjusted differentially (block 530). For example, the controller may adjust, based on the initial error term, the outer MZ interferometer to a target error term, wherein respective branches of at least one of the first MZ interferometer or the second MZ interferometer are adjusted differentially, as described above.

Process 500 may include additional implementations, such as any single implementation or any combination of implementations described below and/or in connection with one or more other processes described elsewhere herein.

In a first implementation, process 500 includes measuring an output power of the outer MZ interferometer, and determining the initial error term comprises determining the initial error term based on the output power of the outer MZ interferometer.

In a second implementation, alone or in combination with the first implementation, adjusting the outer MZ interferometer to the target error term comprises performing a first adjustment to the respective branches of the at least one of the first MZ interferometer or second MZ interferometer; determining an intermediate error term based on the first adjustment, the intermediate error term being different from the initial error term and the target error term; and performing a second adjustment to the respective branches of the at least one of the first MZ interferometer or the second MZ interferometer.

In a third implementation, alone or in combination with one or more of the first and second implementations, process 500 includes determining another intermediate error term based on the second adjustment, and determining whether to perform a third adjustment based on whether the other intermediate error term is equal to the target error term.

In a fourth implementation, alone or in combination with one or more of the first through third implementations, applying the set of phase dithers comprises applying a first phase dither with a first dither state, applying a second phase dither with a second dither state, applying a third phase dither with a third dither state, and applying a fourth phase dither with a fourth dither state.

In a fifth implementation, alone or in combination with one or more of the first through fourth implementations, the first dither state is I+δθ°, Q+δθ°, the second dither state is I+δθ°, Q−δθ°, the third dither state is I−δθ°, Q−δθ°, and the fourth dither state is I−δθ°, Q+δθ°, wherein δθ° represents a phase dither applied to an I branch or a Q branch of the first inner MZ interferometer or of the second inner MZ interferometer.

In a sixth implementation, alone or in combination with one or more of the first through fifth implementations, the first dither state and the third dither state are in-phase dither states, and the second dither state and the fourth dither state are anti-phase dither states.

In a seventh implementation, alone or in combination with one or more of the first through sixth implementations, the initial error term is based on a difference between a first sum of respective output powers associated with the first in-phase dither state and the second in-phase dither state and a second sum of respective output powers associated with the first anti-phase dither state and the second anti-phase dither state.

In an eighth implementation, alone or in combination with one or more of the first through seventh implementations, a sign of the initial error term is based on an output port of the outer MZ interferometer being measured during application of the set of phase dithers.

In a ninth implementation, alone or in combination with one or more of the first through eighth implementations, adjusting the outer MZ interferometer comprises adjusting the outer MZ interferometer based on the sign of the initial error term.

In a tenth implementation, alone or in combination with one or more of the first through ninth implementations, the output port is a destructive port or a constructive port.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A method, comprising:
    applying, by a controller, a set of phase dithers to a first inner Mach-Zehnder (MZ) interferometer and a second inner MZ interferometer, the first inner MZ interferometer and the second inner MZ interferometer being included in an outer MZ interferometer;
        the set of phase dithers including a first in-phase dither state and a second in-phase dither state and including a first anti-phase dither state and a second anti-phase dither state,
    determining, by the controller, an initial error term based at least in part on the set of phase dithers; and
    adjusting, by the controller and based on the initial error term, the outer MZ interferometer to a target phase associated with a target error term, wherein respective branches of at least one of the first MZ interferometer or the second MZ interferometer are adjusted differentially.

2. The method of claim 1, further comprising:
    measuring an output power of the outer MZ interferometer; and
    wherein determining the initial error term comprises:

determining the initial error term based on the output power of the outer MZ interferometer.

3. The method of claim 1, wherein adjusting the outer MZ interferometer to the target error term comprises:
performing a first adjustment to the respective branches of the at least one of the first MZ interferometer or second MZ interferometer;
determining an intermediate error term based on the first adjustment, the intermediate error term being different from the initial error term and the target error term; and
performing a second adjustment to the respective branches of the at least one of the first MZ interferometer or the second MZ interferometer.

4. The method of claim 3, further comprising:
determining another intermediate error term based on the second adjustment; and
determining whether to perform a third adjustment based on whether the other intermediate error term is equal to the target error term.

5. The method of claim 1, wherein applying the set of phase dithers comprises:
applying a first phase dither with a first dither state;
applying a second phase dither with a second dither state;
applying a third phase dither with a third dither state; and
applying a fourth phase dither with a fourth dither state.

6. The method of claim 5, wherein:
the first dither state is I+δθ°, Q+δθ°,
the second dither state is I+δθ°, Q−δθ°,
the third dither state is I−δθ°, Q−δθ°, and
the fourth dither state is I−δθ°, Q+δθ°,
wherein δθ° represents a phase dither applied to an in-phase (I) branch or a quadrature (Q) branch of the first inner MZ interferometer or of the second inner MZ interferometer.

7. The method of claim 5, wherein the first dither state and the third dither state are in-phase dither states, and
wherein the second dither state and the fourth dither state are anti-phase dither states.

8. The method of claim 1, wherein the initial error term is based on a difference between a first sum of respective output powers associated with the first in-phase dither state and the second in-phase dither state and a second sum of respective output powers associated with the first anti-phase dither state and the second anti-phase dither state.

9. The method of claim 1, wherein a sign of the initial error term is based on an output port of the outer MZ interferometer being measured during application of the set of phase dithers.

10. The method of claim 9, wherein adjusting the outer MZ interferometer comprises:
adjusting the outer MZ interferometer based on the sign of the initial error term.

11. The method of claim 9, wherein the output port is a destructive port or a constructive port.

12. A double-nested quadrature modulator, comprising:
an outer Mach-Zehnder (MZ) interferometer including an in-phase (I) branch and a quadrature (Q) branch,
the I branch including a first inner MZ interferometer having a first left branch and a first right branch,
the Q branch including a second inner MZ interferometer having a second left branch arm and a second right branch,
a phase between the first inner MZ interferometer and the second inner MZ interferometer being 90 degrees or −90 degrees;
the double-nested quadrature modulator being configured to:
receive a set of phase dithers at the first inner MZ interferometer and at the second inner MZ interferometer, the set of phase dithers including one or more in-phase dither states and one or more anti-phase dither states; and
receive an adjustment to the outer MZ interferometer, wherein sub-branches of the I branch and the Q branch are adjusted differentially without a direct dither being applied to the outer MZ interferometer.

13. The double-nested quadrature modulator of claim 12, further comprising:
an output port, on the outer MZ interferometer, to output a power level or photocurrent, the adjustment to the outer MZ interferometer being based on the power level or photocurrent.

14. The double-nested quadrature modulator of claim 12, further comprising:
a set of phase shifters, aligned to branches of the double-nested quadrature modulator, to receive electrical signals, the electrical signals being dithered in accordance with application of the set of dither states.

15. The double-nested quadrature modulator of claim 12, wherein the double-nested quadrature modulator is configured to achieve a zero analog-to-digital converter error term at a quadrature phase referenced to a radio frequency power.

16. A double-nested quadrature modulator, comprising:
an outer Mach-Zehnder (MZ) interferometer including an in-phase (I) branch and a quadrature (Q) branch,
the I branch including a first inner MZ interferometer having a first left branch and a first right branch,
the Q branch including a second inner MZ interferometer having a second left branch arm and a second right branch,
a phase between the first inner MZ interferometer and the second inner MZ interferometer being approximately 90 degrees or −90 degrees; and
a controller configured to:
apply a set of phase dithers to the first inner MZ interferometer and the second inner MZ interferometer,
the set of phase dithers including:
a first dither state [I+δθ°, Q+δθ°],
a second dither state [I+δθ°, Q−δθ°],
a third dither state [I−δθ°, Q−δθ° ], and
a fourth dither state [I−δθ°, Q+δθ° ],
wherein δθ represents a phase dither applied to one or more branches of the first inner MZ interferometer or the second inner MZ interferometer,
determine an initial error term based at least in part on the set of phase dithers; and
adjust, based on the initial error term, the outer MZ interferometer to a target error term, wherein branches of the I branch and the Q branch are adjusted differentially without a direct dither applied to the outer MZ interferometer.

17. The double-nested quadrature modulator of claim 16, wherein δθ° is in a range of 1 degree to 15 degrees.

18. The double-nested quadrature modulator of claim 16, wherein the first dither state and the third dither state are in-phase dither states and the second dither state and the fourth dither state are anti-phase dither states, the initial error term being based on a difference between first optical powers associated with the in-phase dither states and second optical powers associated with the anti-phase dither states.

19. The double-nested quadrature modulator of claim 16, wherein each phase dither, of the set of phase dithers, is applied sequentially.

20. The double-nested quadrature modulator of claim 19, wherein a center of a constellation associated with the double-nested quadrature modulator is caused to rotate in a circular manner by sequential application of the set of phase dithers.

* * * * *